United States Patent Office 3,527,772
Patented Sept. 8, 1970

3,527,772
AMINOMETHANODIOXOCINS AND A PROCESS FOR MAKING THEM
Henry E. Hennis, Coleman, Mich., assignor to The Dow Chemical Company, Midland, Mich., a corporation of Delaware
No Drawing. Filed Mar. 25, 1968, Ser. No. 715,490
Int. Cl. C07d 7/24
U.S. Cl. 260—345.2        12 Claims

ABSTRACT OF THE DISCLOSURE

Aminomethanodioxocins having the formula

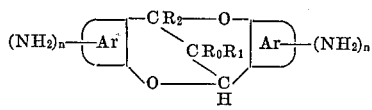

where Ar is a homocyclic or heterocyclic substituted or unsubstituted aromatic ring, $n$ is an integer of from 0 to 2 inclusive; $R_0$ is H; $R_1$ is H, aryl or alkyl; $R_0$ and $R_1$ may together with the C to which they are attached form the cyclohexane ring; and $R_2$ is H, aryl or alkyl are produced from their corresponding nitromethanodioxocins by a process comprising reducing catalytically by hydrogenating said nitromethanodioxocin in the presence of a noble metal catalyst and an inert solvent at a temperature between 0° and 60° C. These new amino compounds are useful in resin production and as dye intermediates.

CROSS-REFERENCES TO RELATED APPLICATIONS

The new compounds produced by this process are related to the compounds disclosed in my copending applications entitled "Methanodioxocins and a Process for Making Them," Ser. No. 669,694, filed Sept. 22, 1967 and "2,2' - Trimethylenedihydroxyaromatic Synthesis," Ser. No. 669,706, filed Sept. 22, 1967.

SUMMARY OF THE INVENTION

It has now been found that new aminodioxocins are produced by a process comprising reducing catalytically their corresponding nitrodioxocins by hydrogenating in the presence of a noble metal catalyst and an inert solvent at a temperature between 0° and 60° C. The aminodioxocins produced by this invention have the formula

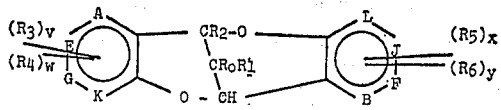

where each of $v$, $w$, $x$ and $y$ independently is a number from 0 to 4; each of A, B, E, F, G, J, K and L independently is N or CH provided that neither A and E, E and G, G and K, B and F, F and J or J and L can simultaneously be N; $R_0$ is H; $R_1$ is H, aryl having up to ten carbon atoms or alkyl having up to eighteen carbon atoms; $R_0$ and $R_1$ may together with the C to which they are attached form the cyclohexane ring; $R_2$ is H, aryl having up to ten carbon atoms or alkyl having up to eighteen carbon atoms; each of $R_3$, $R_4$, $R_5$ and $R_6$, being absent when the corresponding subscript $v$, $w$, $x$ or $y$ is 0, when present is independently aryl having up to ten carbon atoms, alkyl having up to eighteen carbon atoms, $NH_2$, halogen or OM where M is a hydrocarbon radical having up to eighteen carbon atoms provided that at least one of $R_3$, $R_4$, $R_5$ and $R_6$ is always $NH_2$ and is attached to a carbon atom in the E, F, K or L position; and $R_3$ combined with $R_4$, as well as $R_5$ combined with $R_6$, together with the atoms to which they are attached may form the pyridine, pyrimidine, quinoline, benzene, naphthalene, anthracene, phenanthrene or pyran ring. A specific example of an amino compound produced is 2-amino-6H,12H-6,12-methanodibenzo[b,f][1,5]dioxocin or a shorter term, 2-amino-MDBD

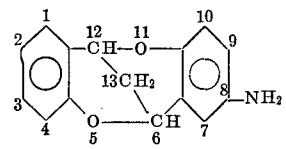

which is produced from its corresponding nitrodioxocin, 2-nitro-MDBD. The numbering in the above formula is that used herein to indicate the location of substituents.

In order to produce these new aminodioxocins, a nitrodioxocin corresponding to the aminodioxocin desired is contacted in any convenient manner with hydrogen and a noble metal catalyst is an inert solvent at a temperature between 0 and 60° C. After reaction, the product is separated from the reaction mixture by conventional methods, e.g. the catalyst is filtered out and the solvent is removed by distillation. The residue is crude aminodioxocin. If unreacted nitrodioxocin is still present, the aminodioxocin product can be separated therefrom by extraction with 5% hydrochloric acid followed by sodium hydroxide addition. The solid which then precipitates may be recrystallized with a solvent such as petroleum ether to yield the purified aminodioxocin.

The nitromethanodioxocin starting material is prepared by reacting an o-vinylhydroxyaromatic compound and an o-hydroxyaldehyde in the presence of an acid catalyst as is more fully set out in my copending application entitled "Methanodioxocins and a Process for Making Them," Ser. No. 669,694, filed Sept. 22, 1967, the disclosure of which is hereby incorporated by reference.

The catalysts which are operable are the noble metal catalysts, such as platinum or palladium. The catalyst may be used in pure form or on the usual catalyst supports such as carbon, alumina, calcium carbonate, silica gel, asbestos or kieselguhr. Any weight ratio of catalyst to reactant is operable, but it is preferred to use a ratio of between 1:1 and 1:100.

The solvent used is one which is inert to the reaction conditions and reactants. The usual solvents, including the hydrocarbon, alcohol and ether solvents can be employed. Specific solvents which are used include xylene, toluene, benzene, hexane, cyclohexane, petroleum ether, methanol, ethanol, diethyl ether and dibutyl ether.

The temperature for this catalytic reduction process is critical. It is preferred to use a temperature between 0° and 60° C. Higher temperatures tend to break the dioxocin ring as is more fully set out in my copending application entitled "2,2' - Trimethylenedihydroxyaromatic Synthesis," Ser. No. 669,706, filed Sept. 22, 1967. Lower temperatures are impractical because of the low reaction rate.

The aminodioxocins produced by this process are useful as resin intermediates. For example, they can be hydrogenated by the process disclosed in "2,2'-Trimethylenedihydroxyaromatic Synthesis," Ser. No. 669,706, filed Sept. 22, 1967, to form an aminodihydroxy compound which is converted into a polycarbonate resin by addition of $COCl_2$ and a base. Similarly, the aminodihydroxy compound can be made into an epoxy resin by adding at least 2 molar equivalents each of a haloalkylene oxide and a base thereto. These amino compounds are also useful as curing agents for epoxy resins when used in an amount to provide 0.1 to 1 amino group per epoxy group. They react with organic polyisocyanates to form polyurethane resins. The mono-amino compounds serve as intermediates to dyestuffs.

DESCRIPTION OF SPECIFIC EMBODIMENT

Example 2-amino-MDBD-2-nitro-MDBD (2.6 g., 0.01 mole) dissolved in 150 ml. of benzene was placed into a flask attached with a hydrogen inlet and a reflux condenser. 5% palladium on carbon (1 g.) was added to the mixture and a stream of hydrogen was bubbled through the solution. The mixture was heated in a water bath at 60° and the reaction was followed by observing the I.R. spectrum of samples taken from the reaction mixture. After four hours' reduction, the reaction was complete, and the mixture was filtered and the catalyst was washed with acetone. The solvent was removed from the combined filtrate and washings by evaporation and the yellow residue was recrystallized from ethanol after activated carbon treatment. After two recrystallizations from ethanol, white needles, M.P. 208–210°, 1.87 g. (87%) was obtained.

*Analysis.*—Calcd. for $C_{15}H_{13}NO_2$ (percent): C, 75.31; H, 5.44; N, 5.86. Found (percent): C, 75.8; H, 5.47; N, 5.81.

This compound is a useful starting material for dyestuffs (as are all the aminodioxocins disclosed herein). Specifically, 2-amino-MDBD is made into a diazonium salt by reaction with nitrous acid. The resulting diazonium salt is then reacted with a phenol or N,N-dialkylarylamine to produce very colorful dyes. The diazonium formation and coupling reaction are more fully set out in a copending application by Chun-Shan Wang and Henry E. Hennis entitled "Azomethanodioxocins," Ser. No. 715,488, filed concurrently herewith, the disclosure of which is hereby incorporated by reference. The resulting dye is applied to the fabric by immersing the fabric in the coupling reaction solution.

Some other new aminodioxocins which are produced from their corresponding nitrodioxocins by similar methods are: 4-amino-MDBD from 4-nitro-MDBD; 2,4-diamino-MDBD from 2,4-ditnitro-MDBD; 2,8-diamino-MDBD from 2,8-dinitro-MDBD; 4,10-diamino-MDBD from 4,10 - dinitro-MDBD; 2,4,8,10-tetraamino-MDBD from 2,3,8,10-tetranitro-MDBD; 4 - amino-13 - methyl-MDBD from 4-nitro-13-methyl-MDBD; 6-ethyl-8-amino-13-methyl-MDBD from 6-ethyl - 8 - nitro - 13 - methyl-MDBD; 2-methyl-10-amino-MDBD from 2-methyl-10-nitro-MDBD; 6-amino-8,15-dimethyl-MBDBD from 6-nitro - 8,15-dimethyl-MBDBD; MBDBD designates the compound 8H,14H-8,14 - methanobenzo(a)dibenzo-[b,f][1,5] dioxocin having the formula

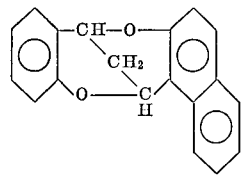

(See my copending application Ser. No. 669,694, filed Sept. 22, 1967, entitled "Methanodioxocins and a Process for Making Them," Example 6.) 2-bromo-10-amino-MDBD from 2-bromo-10-nitro-MDBD; 6,11-dimethyl-9-amino - 7H,13H-7,13 - methano(1,5) - benzodioxocino (3,4-c)-quinoline from 6,11-dimethyl-9-nitro-7H,13H-7, 13 - methano(1,5) - benzodioxocino(3,4-c)-quinoline; 6-ethyl - 8-amino - 13-methyl-6H,12H-6,12-methano-(1,5) benzodioxocino(3,4-b)-pyridine from 6-ethyl-8-nitro-13-methyl - 6H,12H - 6,12 - methano(1,5)benzodioxocino (3,4-b)-pyridine; and 2-methoxy-4-amino-MDBD from 2-methoxy-4-nitro-MDBD.

Similarly, the aminodioxocins given in Table I below are made from their corresponding nitrodioxocins.

TABLE I

| $R_1$ | $R_2$ | $R_3$ | $R_4$ | $R_5$ | $R_6$ | $R_3+R_4$ | $R_5+R_6$ | A | B | E | F | G | J | K | L |
|---|---|---|---|---|---|---|---|---|---|---|---|---|---|---|---|
| $C_3H_7$ | $C_{16}H_{33}$ | | | $NH_2$ | | |  | CH | CH | C | C | CH | C | CH | CH |
| $C_6H_{13}$ | $C_{17}H_{35}$ | Cl | | $NH_2$ | | |  | C | C | CH | C | CH | CH | CH | C |
| Naphthyl | $C_3H_7$ | $OC_{18}H_{37}$ | | $NH_2$ | | $CH_3$ | | CH | CH | C | CH | CH | C | C | N |
| Phenyl | $CH_3$ | $C_4H_9$ | | $NH_2$ | | | 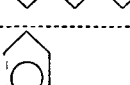 | CH | C | CH | C | CH | N | C | C |
| $CH_3$ | $C_4H_9$ | | | $NH_2$ | | | 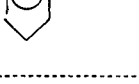 | C | CH | C | N | CH | CH | C | CH |
| $C_4H_9$ | Phenyl | | | $NH_2$ | | $CH_3$ |  | CH | CH | C | C | CH | C | CH | CH |
| $C_{15}H_{31}$ | $C_4H_9$ | | | Naphthyl | $NH_2$ | |  | C | C | C | CH | N | CH | CH | C |
| $C_3H_7$ | $C_{18}H_{37}$ | $C_{18}H_{37}$ | | $NH_2$ | | | | CH | N | C | C | CH | CH | C | C |
| $C_{18}H_{37}$ | $C_4H_9$ | $NH_2$ | | $C_4H_9$ | | | | CH | C | N | CH | CH | CH | C | C |
| $C_4H_9$ | $C_6H_{13}$ | | | $NH_2$ | | |  | CH | CH | C | C | C | C | CH | C |
| $C_7H_{15}$ | Naphthyl | $CH_3$ | | $NH_2$ | Phenoxy | | | N | CH | C | C | CH | CH | CH | |

I claim:
1. An aminomethanodioxocin compound having the formula

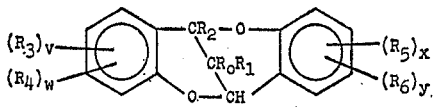

where each of $v$, $w$, $x$ and $y$ independently is a number from 0 to 4; $R_0$ is H; $R_1$ is H, aryl hydrocarbon having up to ten carbon atoms or alkyl having up to eighteen carbon atoms; $R_0$ and $R_1$ may together with the C to which they are attached form the cyclohexane ring; $R_2$ is H, aryl hydrocarbon having up to ten carbon atoms or alkyl having up to eighteen carbon atoms; each of $R_3$, $R_4$, $R_5$ and $R_6$, being absent when the corresponding subscript $v$, $w$, $x$ or $y$ is 0, when present is independently aryl hydrocarbon having up to ten carbon atoms, alkyl having up to eighteen carbon atoms, $NH_2$, halogen or OM where M is an alkyl radical having up to eighteen carbon atoms or phenyl, provided that at least one of $R_3$, $R_4$, $R_5$ and $R_6$ is always $NH_2$ and is attached in the 2, 4, 8 or 10 position, and $R_3$ combined with $R_4$, as well as $R_5$ combined with $R_6$, may form the benzene, naphthalene, anthracene or phenanthrene ring.

2. A compound as defined in claim 1 wherein $R_3$, $R_4$, $R_5$ and $R_6$ are in the 2, 4, 8 and 10 positions.

3. A compound as defined in claim 1 wherein $R_3$ and $R_5$ are in the 2 and 4 positions and $R_4$ and $R_6$ are H.

4. A compound as defined in claim 1 wherein $R_0$ and $R_1$ are H.

5. A compound as defined in claim 1 wherein $R_1$ is H or alkyl having up to eighteen carbon atoms.

6. A compound as defined in claim 1 wherein $R_2$ is H or alkyl having up to eighteen carbon atoms.

7. A compound as defined in claim 1 wherein $R_0$, $R_1$, $R_2$, $R_3$ and $R_5$ are H; $R_4$ and $R_6$ are $NH_2$; $v$ and $x$ are zero and $w$ and $y$ are each 1.

8. 2-amino-MDBD having the formula

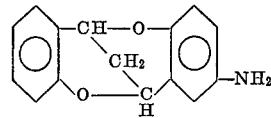

9. A process for producing an aminodioxocin as defined in claim 1 which comprises reducing catalytically by hydrogenating the corresponding nitrodioxocin in the presence of a noble metal catalyst and an inert solvent at a temperature between 0° and 60° C.

10. A process as defined in claim 9 wherein the noble metal is platinum or palladium.

11. A compound as defined in claim 3 wherein $R_5$ is H.

12. A compound as defined in claim 11 wherein $R_0$ and $R_2$ are H.

References Cited

Bhatia et al., Tetrahedron Letters, pp. 1717–20 (1966).
Westoo, Acta Chem. Scand., vol. 13, pp. 679–82 (1959).
Theilheimer, "Synthetic Methods of Organic Chemistry", vol. 11, Interscience Pub., Inc., New York (1957) entry 32.
Theilheimer, "Synthetic Methods of Organic Chemistry," vol. 14, Interscience Pub. Inc., New York (1960) entries 39 and 43.

HENRY R. JILES, Primary Examiner

J. M. FORD, Assistant Examiner

U.S. Cl. X.R.
260—61, 77.5, 830